(12) United States Patent
Matsumoto et al.

(10) Patent No.: US 6,570,148 B2
(45) Date of Patent: May 27, 2003

(54) SIGNAL INPUT CUTOFF DETECTOR, PHOTO RECEIVER AND SIGNAL INPUT CUTOFF DETECTING METHOD

(75) Inventors: Yoshihiro Matsumoto, Tokyo (JP); Takashi Kuriyama, Tokyo (JP); Yoshinori Honma, Tokyo (JP); Masashi Tachigori, Tokyo (JP)

(73) Assignee: NEC Corporation, Tokyo (JP)

( * ) Notice: Subject to any disclaimer, the term of this patent is extended or adjusted under 35 U.S.C. 154(b) by 181 days.

(21) Appl. No.: 09/864,306

(22) Filed: May 25, 2001

(65) Prior Publication Data

US 2001/0048067 A1 Dec. 6, 2001

(30) Foreign Application Priority Data

May 26, 2000 (JP) ........................................ 2000-155797

(51) Int. Cl.[7] ................................................ H01J 40/14
(52) U.S. Cl. .................................... 250/221; 250/214 R
(58) Field of Search ........................ 250/214 AG, 221, 250/222.1, 222.2, 551, 214 R; 340/500, 540, 506–507, 555–557; 327/509, 514

(56) References Cited

U.S. PATENT DOCUMENTS 5,589,683 A * 12/1996 Nakai ...................... 250/214 R
6,462,325 B1 * 10/2002 Yanagisawa ............ 250/214 R

* cited by examiner

Primary Examiner—David Porta
Assistant Examiner—Patrick J. Lee
(74) Attorney, Agent, or Firm—Whitham, Curtis & Christofferson, P.C.

(57) ABSTRACT

A photo receiver branches a data signal obtained by photoelectric conversion and supplies the signal to a signal cutoff detector. Depending on the degree of an autocorrelation of a data signal obtained by an autocorrelation detector, the signal cutoff detector detects abnormality/normality. Depending on a level of a control signal to a VCO contained in a frequency phase-locked loop for use in clock generation, an out-of-synchronization detector makes determination of abnormality/normality. Outputs of both the detectors are ORed at an alarm processor and when at least one of the detectors detects abnormality, the detector generates an alarm.

51 Claims, 13 Drawing Sheets

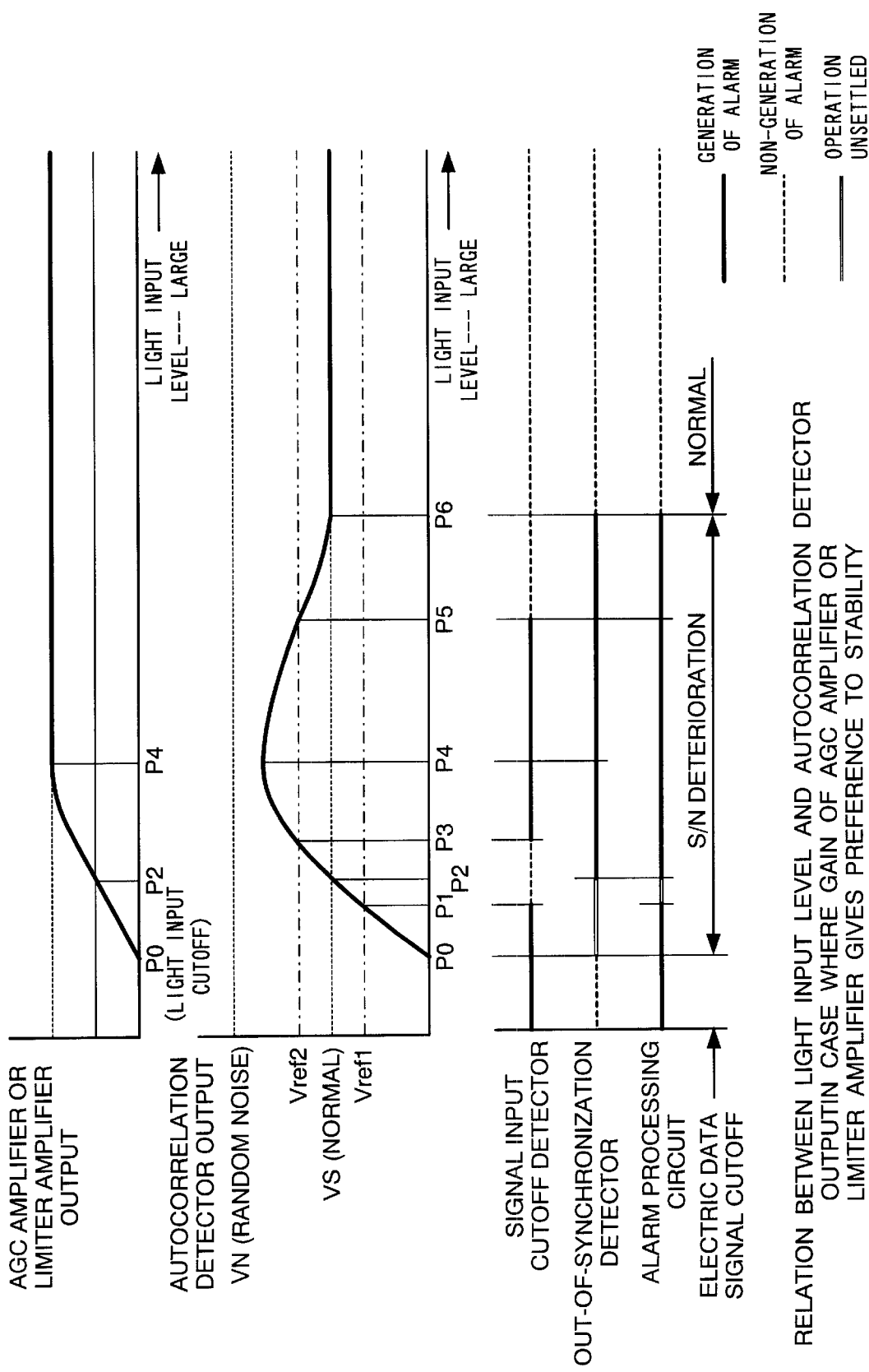

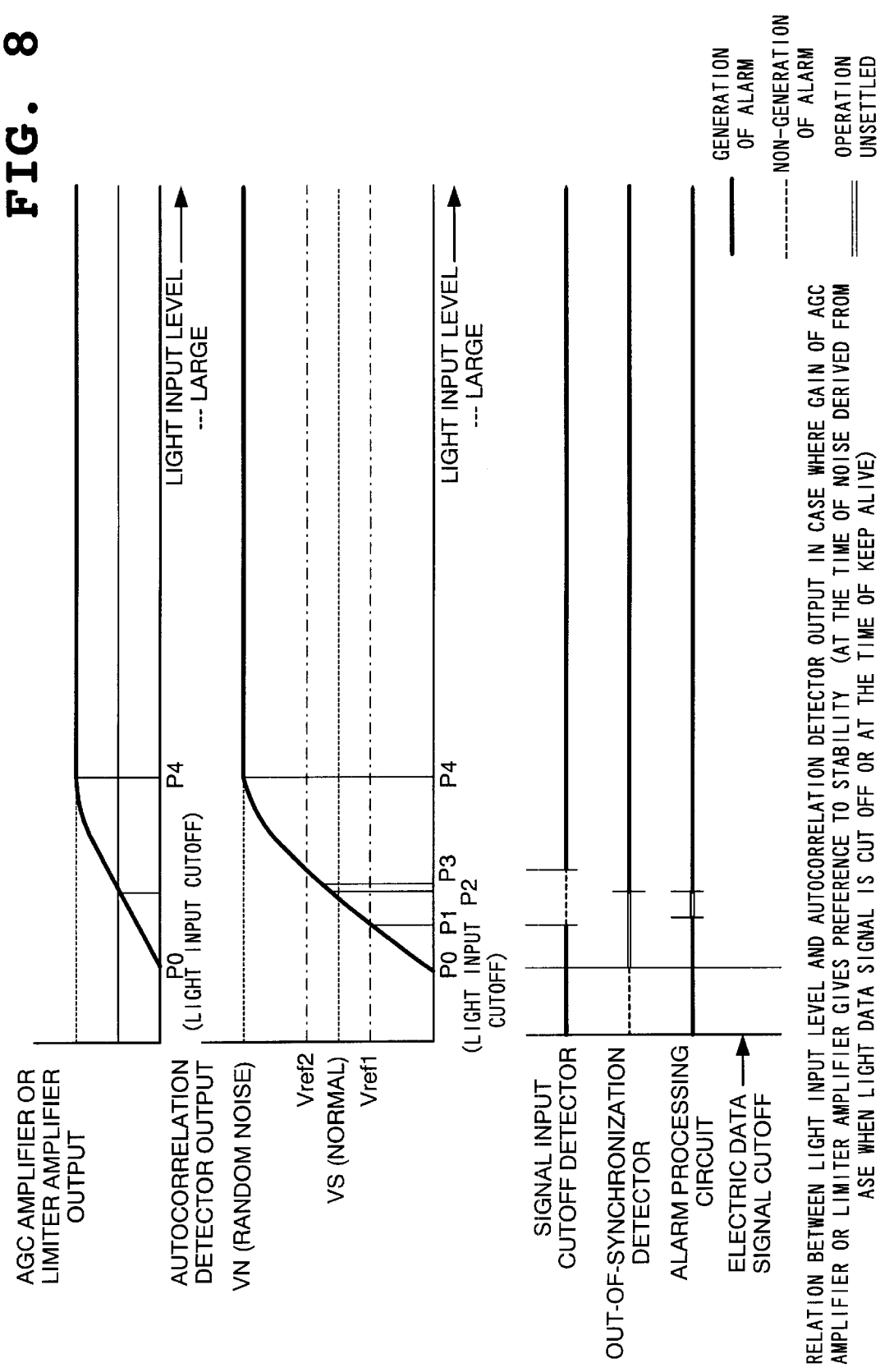

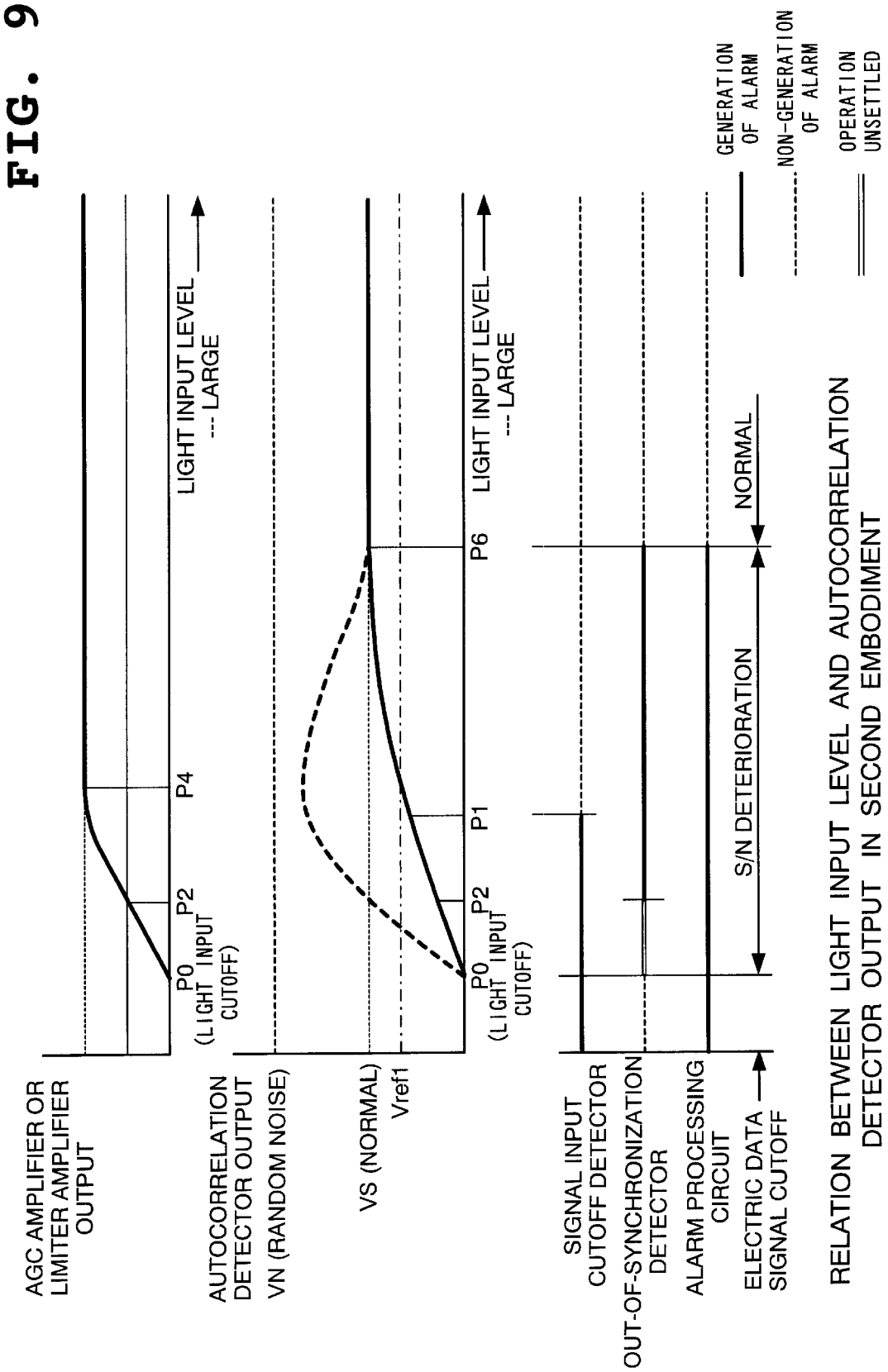

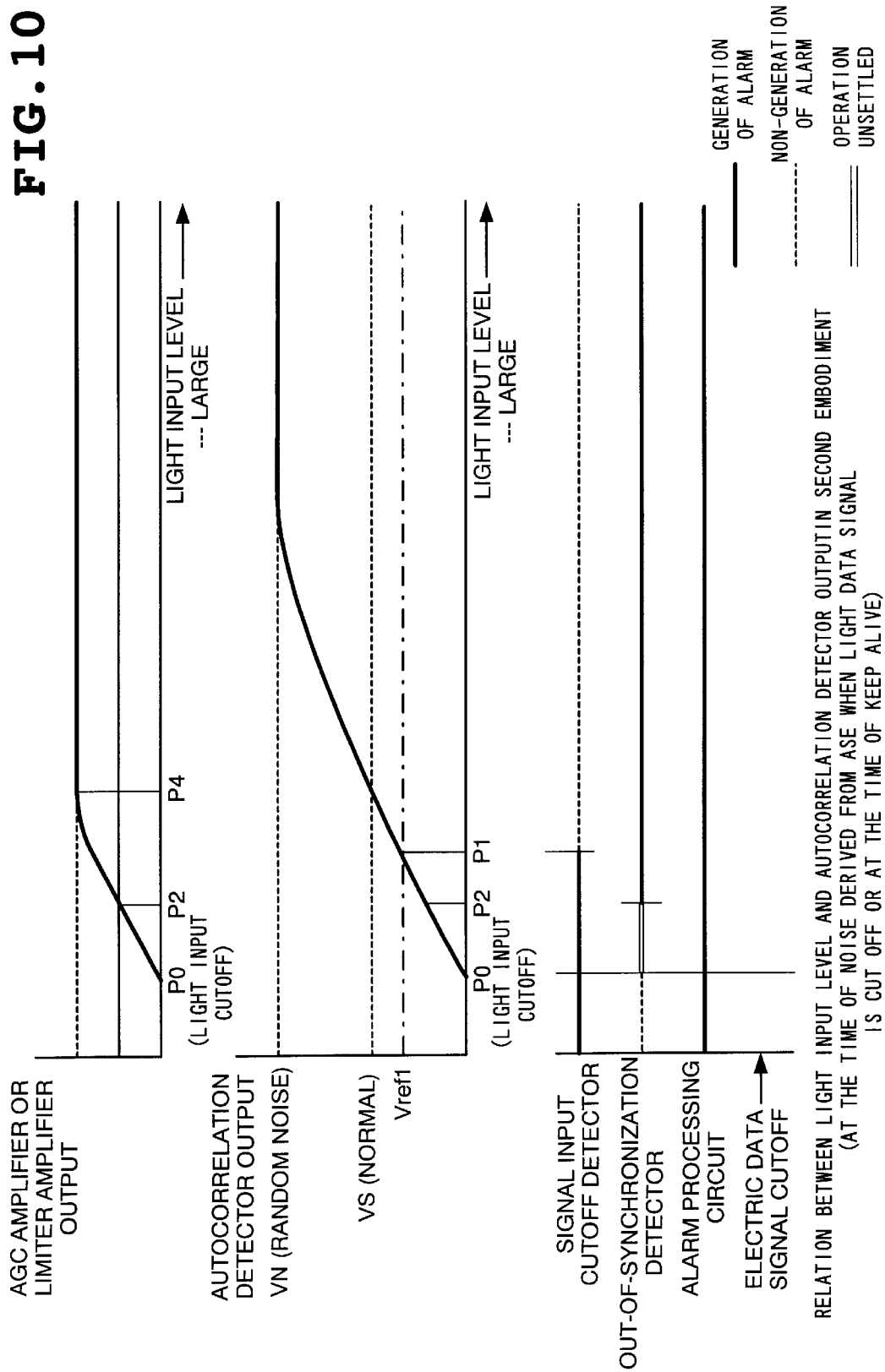

FIG. 11

| | SIGNAL INPUT CUTOFF DETECTOR | OUT-OF-FREQUENCY-SYNCHRONIZATION DETECTOR | ALARM PROCESSING CIRCUIT | REMARKS |
|---|---|---|---|---|
| NORMAL INPUT | NON-GENERATION OF ALARM | NON-GENERATION OF ALARM | NON-GENERATION OF ALARM | |
| LIGHT INPUT CUTOFF | ALARM GENERATION | UNSTABLE OPERATION (NON-GENERATION DEPENDING ON NOISE LEVEL) | ALARM GENERATION | NO LIGHT INPUT (ONLY THERMAL NOISE IN ELECTRIC CIRCUIT) |
| LIGHT DATA SIGNAL CUTOFF (NOISE DERIVED FROM ASE) | UNSTABLE OPERATION (NON-GENERATION DEPENDING ON NOISE LEVEL) | ALARM GENERATION (OUT OF SYNCHRONIZATION) | ALARM GENERATION | NOISE DERIVED FROM ASE (NO KEEP ALIVE) |
| LIGHT DATA SIGNAL CUTOFF (KEEP ALIVE) | UNSTABLE OPERATION (NON-GENERATION DEPENDING ON NOISE LEVEL) | ALARM GENERATION (OUT OF SYNCHRONIZATION) | ALARM GENERATION | NOISE DUE TO KEEP ALIVE DUMMY SIGNAL (CW) |
| ELECTRIC DATA SIGNAL CUTOFF | ALARM GENERATION | NON-GENERATION OF ALARM (OPERATION STOP) | ALARM GENERATION | NO ELECTRIC DATA INPUT SIGNAL DUE TO ELECTRIC CIRCUIT FAILURE |

TABLE INDICATIVE OF ALARM GENERATION CONDITION AT EACH FAILURE

SIGNAL INPUT CUTOFF DETECTOR, PHOTO RECEIVER AND SIGNAL INPUT CUTOFF DETECTING METHOD

BACKGROUND OF THE INVENTION

1. Field of the Invention

The present invention relates to a photo receiver and a photo receiving method, and more particularly, to a signal cutoff detector and a signal cutoff detecting method.

2. Description of the Related Art

For enhancing reliability of an optical communication system to quickly take countermeasure in case a failure occurs, demanded is improving a failure detection function of each part of the system.

For such a purpose, a photo receiver is conventionally provided with a function of detecting a signal being cut off. Structure of a conventional signal cutoff detection circuit is shown in FIG. 12. The signal cutoff detection circuit of FIG. 12 includes a photo detector 10, a preamplifier 11, an amplifier or limiter amplifier 12 with an automatic gain control (AGC) function, a band-pass filter 13, an amplifier 14, a limiter amplifier 15, a peak value detection circuit 16, a delay element 17, a discrimination circuit 18 and a comparator 19. A light signal applied to the photo receiver is converted into an electric signal by the photo detector 10 and then amplified into a signal of a predetermined level by the preamplifier 11 and the AGC amplifier or limiter amplifier 12. An output of the AGC amplifier or limiter amplifier 12 is branched into two, one of which is applied to a data input terminal of the discrimination circuit 18. The other signal is input to the band-pass filter 13, in which a clock component contained in the data signal is extracted. After being amplified to a signal of a predetermined level by the amplifier 14 and the limiter amplifier 15, the extracted clock signal is input to the discrimination circuit 18, in which it is used as an identification clock of a data signal. A delay difference between a clock signal and a data signal is compensated for by the delay element 17.

Here, a part of the output of the amplifier 14 is input to the peak value detection circuit 16. At the peak value detection circuit 16, a peak level of the input clock signal is detected and the comparator 19 determines whether a clock signal exists or not based on whether the detected level reaches a predetermined level. When the determination is made that no clock signal exists, it can be known that no appropriate light signal is input to the photo receiver or that some abnormality occurs in the photo receiver.

In the field of optical communication today, there are many cases where an optical relay amplifier is used as a relay and where wave-length division multiplexing (WDM) transmission is conducted for increasing a transmission capacity per optical fiber.

In such a transmission system, in a case where a failure on a transmission path, a photo transmitter and receiver or a relay eliminates a light data signal, an amplified spontaneous emission (ASE) generated at each optical relay amplifier is accumulated to reach a photo receiver. On the other hand, in wave-length division multiplexing (WDM) transmission, when a light data signal of a part of wave-length channels is lost due to some failure or other, processing of superposing a dummy signal (continuous wave (CW) light) on a wave-length whose signal is lost called "keep alive" is conducted in some cases in order to balance power between the respective wave-length channels. In such cases, while wavelength light itself exists, no signal exists, so that such cases should be detected being abnormal. At the time of a noise caused by ASE or the time of keep alive, a photo receiver might be subjected to a high-level noise, which makes it difficult for conventional methods to detect signal cutoff.

SUMMARY OF THE INVENTION

An object of the present invention is to provide a signal input cutoff detector having a function of reliably detecting signal cutoff in a wave-length division multiplexing (WDM) transmission system and a transmission system including an optical relay amplifier.

According to the first aspect of the invention, a signal input cutoff detector comprises a signal cutoff detector which detects a level of a data signal converted from a light input signal into an electric signal and when the level is below a predetermined value, generates a first alarm signal; and an out-of-synchronization detector which monitors a VCO control signal which controls a voltage controlled oscillator (VCO) to have a frequency and a phase synchronized with the data signal and when a level of the control signal exceeds a predetermined value, generates a second alarm signal.

In the preferred construction, the signal input cutoff detector further comprises an alarm processor which generates a third alarm signal according to generation conditions of the first alarm signal and second alarm signal.

In another preferred construction, the signal cutoff detector includes an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal.

In another preferred construction, the signal input cutoff detector further comprises an alarm processor which generates a third alarm signal according to generation conditions of the first alarm signal and second alarm signal, wherein the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, and the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal.

In another preferred construction, the signal input cutoff detector further comprises an alarm processor which generates a third alarm signal according to generation conditions of the first alarm signal and second alarm signal, wherein the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, and the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, and the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal, the delay time being half a time length of one bit of the data signal.

In another preferred construction, the signal input cutoff detector further comprises an alarm processor which generates a third alarm signal according to generation conditions of the first alarm signal and second alarm signal, wherein the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, and the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal, the delay time being half a time length of one bit of the data signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, the at least one predetermined reference voltage including a first reference voltage having a value between the mean value obtained when the data signal is large enough and zero, and a second reference voltage higher than the mean value obtained when the data signal is large enough.

In another preferred construction, the signal input cutoff detector further comprises an alarm processor which generates a third alarm signal according to generation conditions of the first alarm signal and second alarm signal, wherein the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, the at least one predetermined reference voltage including a first reference voltage having a value between the mean value obtained when the data signal is large enough and zero.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, the at least one predetermined reference voltage including a first reference voltage having a value between the mean value obtained when the data signal is large enough and zero, and a second reference voltage higher than the mean value obtained when the data signal is large enough.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, and the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal, the delay time being half a time length of one bit of the data signal, and the at least one predetermined reference voltage including a first reference voltage having a value between the mean value obtained when the data signal is large enough and zero, and a second reference voltage higher than the mean value obtained when the data signal is large enough.

In another preferred construction, the signal cutoff detector further including a hysteresis amplifier provided at an input part of the signal cutoff detector.

In another preferred construction, the signal input cutoff detector further comprising an alarm processor which generates a third alarm signal according to generation conditions of the first alarm signal and second alarm signal, wherein the signal cutoff detector further including a hysteresis amplifier provided at an input part of the signal cutoff detector.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, and which further comprises a hysteresis amplifier provided at an input part of the signal cutoff detector.

In another preferred construction, the signal cutoff detector including an autocorrelation detector which calculates an autocorrelation of the data signal to output an autocorrelation signal, a first comparator which compares the autocorrelation signal with at least one predetermined reference voltage and when the autocorrelation signal is larger, outputs the first alarm signal, and a hysteresis amplifier provided at an input part of the signal cutoff detector, the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal.

In another preferred construction, the signal cutoff detector including an autocorrelation detector which calculates an autocorrelation of the data signal to output an autocorrelation signal, a first comparator which compares the autocorrelation signal with at least one predetermined reference voltage and when the autocorrelation signal is larger, outputs the first alarm signal, and a hysteresis amplifier provided at an input part of the signal cutoff detector, the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal, the delay time being half a time length of one bit of the data signal.

In another preferred construction, the signal cutoff detector including an autocorrelation detector which calculates an autocorrelation of the data signal to output an autocorrelation signal, a first comparator which compares the autocorrelation signal with at least one predetermined reference voltage and when the autocorrelation signal is larger, outputs the first alarm signal, and a hysteresis amplifier provided at an input part of the signal cutoff detector, the at least one predetermined reference voltage including a first reference voltage having a value between the mean value obtained when the data signal is large enough and zero, and a second reference voltage higher than the mean value obtained when the data signal is large enough.

In another preferred construction, the out-of-synchronization detector including a second comparator which compares a VCO control signal which controls a voltage controlled oscillator (VCO) to have a frequency and a phase synchronized with the data signal and a predetermined reference voltage and when the VCO control signal is larger, outputs the second alarm signal.

In another preferred construction, the signal input cutoff detector further comprising an alarm processor which generates a third alarm signal according to generation conditions of the first alarm signal and second alarm signal, wherein the out-of-synchronization detector including a second comparator which compares a VCO control signal which controls a voltage controlled oscillator (VCO) to have a frequency and a phase synchronized with the data signal and a predetermined reference voltage and when the VCO control signal is larger, outputs the second alarm signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputting the first alarm signal, and the out-of-synchronization detector including a second comparator which compares a VCO control signal which controls a voltage controlled oscillator (VCO) to have a frequency and a phase synchronized with the data signal and a predetermined reference voltage and when the VCO control signal is larger, outputs the second alarm signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, and the out-of-synchronization detector including a second comparator which compares a VCO control signal which controls a voltage controlled oscillator (VCO) to have a frequency and a phase synchronized with the data signal and a predetermined reference voltage and when the VCO control signal is larger, outputs the second alarm signal, the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, and the out-of-synchronization detector including a second comparator which compares a VCO control signal which controls a voltage controlled oscillator (VCO) to have a frequency and a phase synchronized with the data signal and a predetermined reference voltage and when the VCO control signal is larger, outputs the second alarm signal, the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal, and the delay time being half a time length of one bit of the data signal.

In another preferred construction, the signal cutoff detector including an autocorrelation detector which calculats an autocorrelation of the data signal to output an autocorrelation signal, and a first comparator which compares the autocorrelation signal with at least one predetermined reference voltage and when the autocorrelation signal is larger, outputs the first alarm signal, and the out-of-synchronization detector including a second comparator which compares a VCO control signal which controls a voltage controlled oscillator (VCO) to have a frequency and a phase synchronized with the data signal and a predetermined reference voltage and when the VCO control signal is larger, outputs the second alarm signal, the at least one predetermined reference voltage including a first reference voltage having a value between the mean value obtained when the data signal is large enough and zero, and a second reference voltage higher than the mean value obtained when the data signal is large enough.

In another preferred construction, the signal cutoff detector further including a hysteresis amplifier provided at an input part of the signal cutoff detector, and the out-of-synchronization detector including a second comparator which compares a VCO control signal which controls a voltage controlled oscillator (VCO) to have a frequency and a phase synchronized with the data signal and a predetermined reference voltage and when the VCO control signal is larger, outputs the second alarm signal.

According to the second aspect of the invention, a photo receiver comprises a photo detector which converts a light input signal into an electric signal, an amplifier which amplifies the electric signal to have a predetermined amplitude, a frequency phase-locked loop which contains a VCO and generates a clock synchronized with an output of the amplifier and a discrimination circuit for discriminating an output of the amplifier by the clock, and a signal input cutoff detector, wherein
the signal input cutoff detector including
a signal cutoff detector which detects a level of a data signal converted from a light input signal into an electric signal and when the level is below a predetermined value, generates a first alarm signal, and
an out-of-synchronization detector which monitors a VCO control signal which controls a voltage controlled oscillator (VCO) to have a frequency and a phase synchronized with the data signal and when a level of the control signal exceeds a predetermined value, generates a second alarm signal.

In the preferred construction, the signal input cutoff detector further including an alarm processor which generates a third alarm signal according to generation conditions of the first alarm signal and second alarm signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal.

In another preferred construction, the signal input cutoff detector further including an alarm processor which generates a third alarm signal according to generation conditions of the first alarm signal and second alarm signal, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputting the first alarm signal, and the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, and the autocorrelation detector including a delay element which delays the data signal by a predetermined delay time to output a delayed data signal, an exclusive OR circuit which calculates an exclusive OR of the data signal and the delayed data signal to output an exclusive OR signal, and a first integrator which calculates a mean value of the exclusive OR signal, the delay time being half a time length of one bit of the data signal.

In another preferred construction, the signal cutoff detector including an autocorrelation detector which calculates an autocorrelation of the data signal to output an autocorrelation signal, and a first comparator which compares the autocorrelation signal with at least one predetermined reference voltage and when the autocorrelation signal is larger, outputs the first alarm signal, the at least one predetermined reference voltage including a first reference voltage having a value between the mean value obtained when the data signal is large enough and zero, and a second reference voltage higher than the mean value obtained when the data signal is large enough.

In another preferred construction, the signal cutoff detector further including a hysteresis amplifier provided at an input part of the signal cutoff detector.

In another preferred construction, the out-of-synchronization detector including a second comparator which compares a VCO control signal which controls a voltage controlled oscillator (VCO) to have a frequency and a phase synchronized with the data signal and a predetermined reference voltage and when the VCO control signal is larger, outputs the second alarm signal.

According to the third aspect of the invention, a signal input cutoff detecting method comprising the steps of:

detecting a level of a data signal converted from a light input signal into an electric signal and when the level is below a predetermined value, generating a first alarm signal, and monitoring a VCO control signal which controls a voltage controlled oscillator (VCO) to have a frequency and a phase synchronized with the data signal and when a level of the control signal exceeds a predetermined value, generating a second alarm signal.

In the preferred construction, the signal input cutoff detecting method further comprising alarm processing step of generating a third alarm signal according to generation conditions of the first alarm signal and second alarm signal.

In another preferred construction, the signal input cutoff detection step includes autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal.

In another preferred construction, the signal input cutoff detecting method further comprising alarm processing step of generating a third alarm signal according to generation conditions of the first alarm signal and second alarm signal, wherein the signal input cutoff detection step includes autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal.

In another preferred construction, the signal input cutoff detection step includes autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal, the at least one predetermined reference voltage including a first reference voltage having a value between the mean value obtained when the data signal is large enough and zero, and a second reference voltage higher than the mean value obtained when the data signal is large enough.

In another preferred construction, the signal input cutoff detecting method further comprising alarm processing step of generating a third alarm signal according to generation conditions of the first alarm signal and second alarm signal, wherein the signal input cutoff detection step includes autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal, the at least one predetermined reference voltage including a first reference voltage having a value between the mean value when the data signal is large enough and zero, and a second reference voltage higher than the mean value obtained when the data signal is large enough.

In another preferred construction, the out-of-synchronization detection step includes second comparison step of comparing a VCO control signal which controls a voltage controlled oscillator (VCO) to have a frequency and a phase synchronized with the data signal and a predetermined reference voltage and when the VCO control signal is larger, outputting the second alarm signal.

In another preferred construction, the signal input cutoff detecting method further comprising alarm processing step of generating a third alarm signal according to generation conditions of the first alarm signal and second alarm signal, wherein the out-of-synchronization detection step includes second comparison step of comparing a VCO control signal which controls a voltage controlled oscillator (VCO) to have a frequency and a phase synchronized with the data signal and a predetermined reference voltage and when the VCO control signal is larger, outputting the second alarm signal.

In another preferred construction, the signal input cutoff detection step includes autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal, and the out-of-synchronization detection step includes second comparison step of comparing a VCO control signal which controls a voltage controlled oscillator (VCO) to have a frequency and a phase synchronized with the data signal and a predetermined reference voltage and when the VCO control signal is larger, outputting the second alarm signal.

In another preferred construction, the signal input cutoff detecting method further comprising alarm processing step of generating a third alarm signal according to generation conditions of the first alarm signal and second alarm signal, wherein the signal input cutoff detection step includes autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal, and the out-of-synchronization detection step includes second comparison step of comparing a VCO control signal which controls a voltage controlled oscillator (VCO) to have a frequency and a phase synchronized with the data signal and a predetermined reference voltage and when the VCO control signal is larger, outputting the second alarm signal.

In another preferred construction, the signal input cutoff detection step includes autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal, the at least one predetermined reference voltage including a first reference voltage having a value between the mean value obtained when the data signal is large enough and zero, and a second reference voltage higher than the mean value obtained when the data signal is large enough, and the out-of-synchronization detection step includes second comparison step of comparing a VCO control signal which controls a voltage controlled oscillator (VCO) to have a frequency and a phase synchronized with the data signal and a predetermined reference voltage and when the VCO control signal is larger, outputting the second alarm signal.

In another preferred construction, the signal input cutoff detecting method further comprising alarm processing step of generating a third alarm signal according to generation conditions of the first alarm signal and second alarm signal, wherein the signal input cutoff detection step includes:

autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal, the at least one predetermined reference voltage including a first reference voltage having a value between the mean value obtained when the data signal is large enough and zero, and a second reference voltage higher than the mean value obtained when the data signal is large enough, and the out-of-synchronization detection step includes second comparison step of comparing a VCO control signal which controls a voltage controlled oscillator (VCO) to have a frequency and a phase synchronized with the data signal and a predetermined reference voltage and when the VCO control signal is larger, outputting the second alarm signal.

According to another aspect of the invention, a photo receiving method comprising step of converting a light input signal into an electric signal and amplifying the converted signal to have a predetermined amplitude, step of, with a VCO contained, generating a clock synchronized with a data signal amplified to the predetermined amplitude, step of discriminating a data signal amplified to the predetermined amplitude by the clock, signal input cutoff detection step of detecting a level of a data signal converted from a light input signal into an electric signal and when the level is below a predetermined value, generating a first alarm signal, and out-of-synchronization detection step of monitoring a VCO control signal which controls a voltage controlled oscillator (VCO) to have a frequency and a phase synchronized with the data signal and when a level of the control signal exceeds a predetermined value, generating a second alarm signal.

In the preferred construction, the photo receiving method further comprising alarm processing step of generating a third alarm signal according to generation conditions of the first alarm signal and second alarm signal.

In another preferred construction, the signal input cutoff detection step includes autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal.

In another preferred construction, the signal input cutoff detection step includes autocorrelation detection step of calculating an autocorrelation of the data signal to output an autocorrelation signal, and first comparison step of comparing the autocorrelation signal with at least one predetermined reference voltage and when the autocorrelation signal is larger, outputting the first alarm signal, the at least one predetermined reference voltage including a first reference voltage having a value between the mean value obtained when the data signal is large enough and zero, and a second reference voltage higher than the mean value obtained when the data signal is large enough.

In another preferred construction, the out-of-synchronization detection step includes second comparison step of comparing a VCO control signal which controls a voltage controlled oscillator (VCO) to have a frequency and a phase synchronized with the data signal and a predetermined reference voltage and when the VCO control signal is larger, outputting the second alarm signal.

As described in the foregoing, the present invention is provided with a signal cutoff detector for detecting a level of an input data signal and when the level is lower than a predetermined value, generating a first alarm signal and an out-of-synchronization detector for generating a second alarm signal when a VCO control signal from a frequency phase-locked loop exceeds a predetermined value, that is, when the signal is out of synchronization. Using these two detectors to take detection results of each detector into consideration enables reliable generation of an alarm against a failure, as well as enabling a failing part to be cut out.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is a diagram showing a relation between a light input level and an output of an autocorrelation detector in a case where a gain of an AGC amplifier or a limiter amplifier gives preference to stability;

FIG. 8 is a diagram showing a relation between a light input level and an output of the autocorrelation detector (at the time of noise derived from ASE when a light data signal is cut off or at the time of keep alive) in a case where a gain of the AGC amplifier or the limiter amplifier gives preference to stability;

FIG. 9 is a diagram showing a relation between a light input level and an output of the autocorrelation detector according to the second embodiment;

FIG. 10 is a diagram showing a relation between a light input level and an output of the autocorrelation detector (at the time of noise derived from ASE when a light data signal is cut off or at the time of keep alive) according to the second embodiment;

FIG. 11 is a table showing an alarm generation condition at each failure;

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Structure and operation of a signal input cutoff detector according to the present invention will be described with reference to the drawings.

(First Embodiment)

Figure 1:
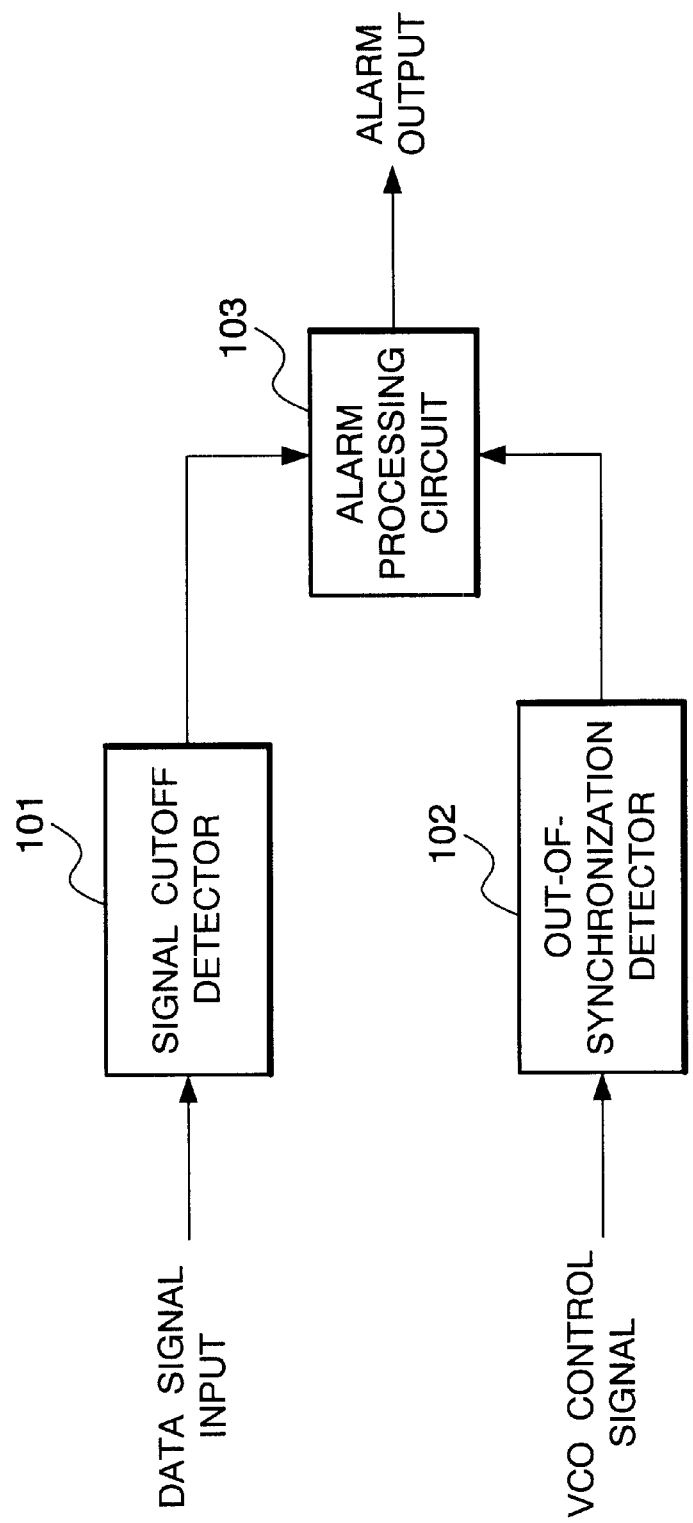
FIG. 1 is a diagram showing a basic structure of a signal input cutoff detector according to the present invention.

Structure of a signal input cutoff detector according to a first embodiment of the present invention is shown in FIG. 1. The signal input cutoff detector of the present embodiment includes a signal cutoff detector 101, an out-of-synchronization detector 102 and an alarm processor 103.

The signal cutoff detector 101 determines whether an applied signal has a predetermined autocorrelation or not and when it fails to have the predetermined autocorrelation, outputs a signal indicating that an abnormality occurs.

When a level of a VCO control signal from a frequency phase-locked loop for synchronizing frequencies and phases of an input signal and a VCO with each other becomes higher than a predetermined level, the out-of-synchronization detector 102 determines that out-of-synchronization occurs to output a signal indicating that an abnormality occurs.

The alarm processor 103 receives output signals of the signal cutoff detector 101 and the out-of-synchronization detector 102 to output a signal indicating that an abnormality occurs taking the output signals of the signal cutoff detector 101 and the out-of-synchronization detector 102 into consideration. In the present embodiment, when at least one of the above-described circuits outputs a signal indicating that an abnormality occurs, the alarm processor determines that an abnormality occurs at the present photo receiver to output a signal indicative of occurrence of an abnormality.

Figure 2:
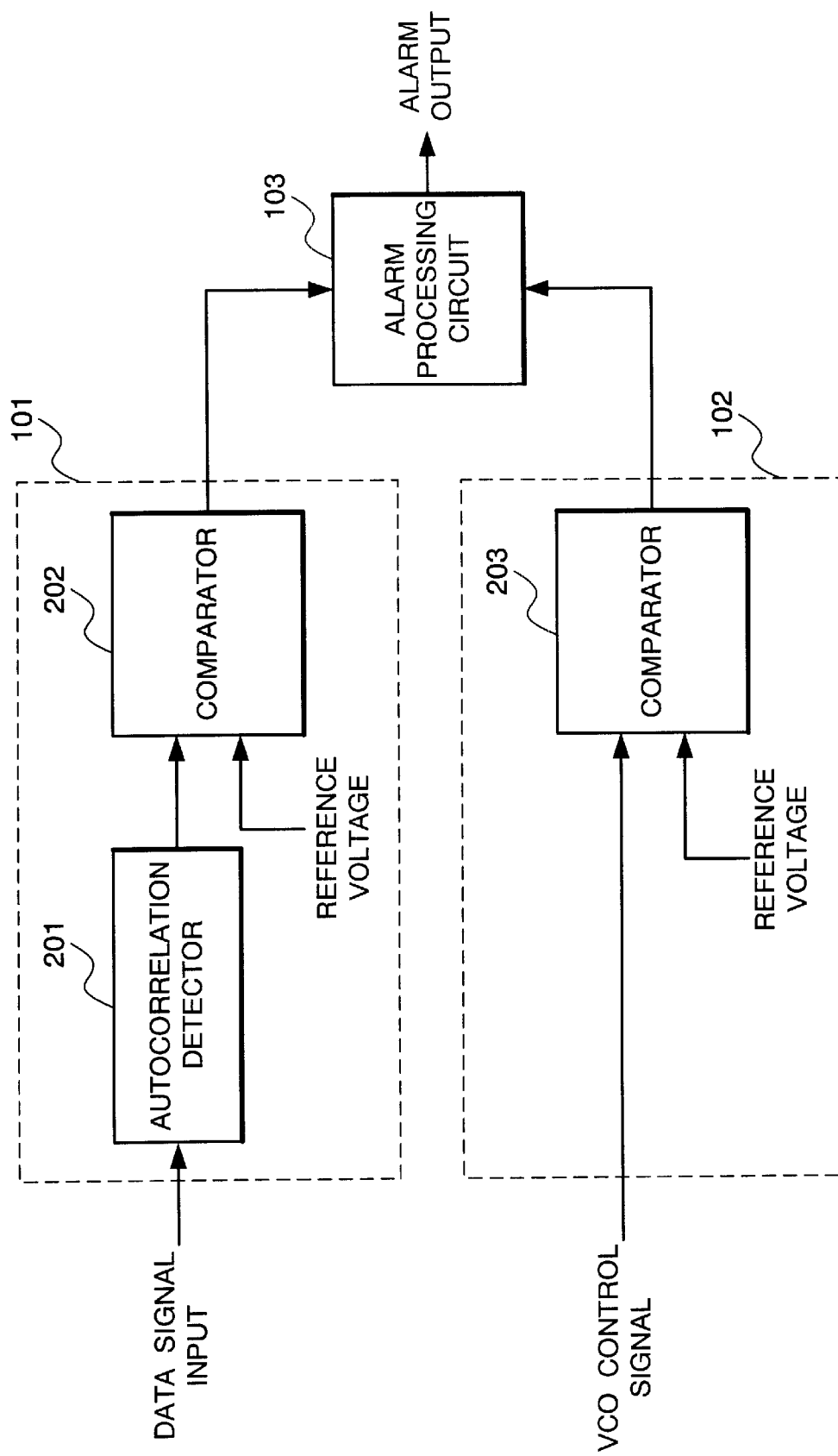
FIG. 2 is a diagram showing a structure of a signal input cutoff detector according to a first embodiment of the present invention.
Figure 3:
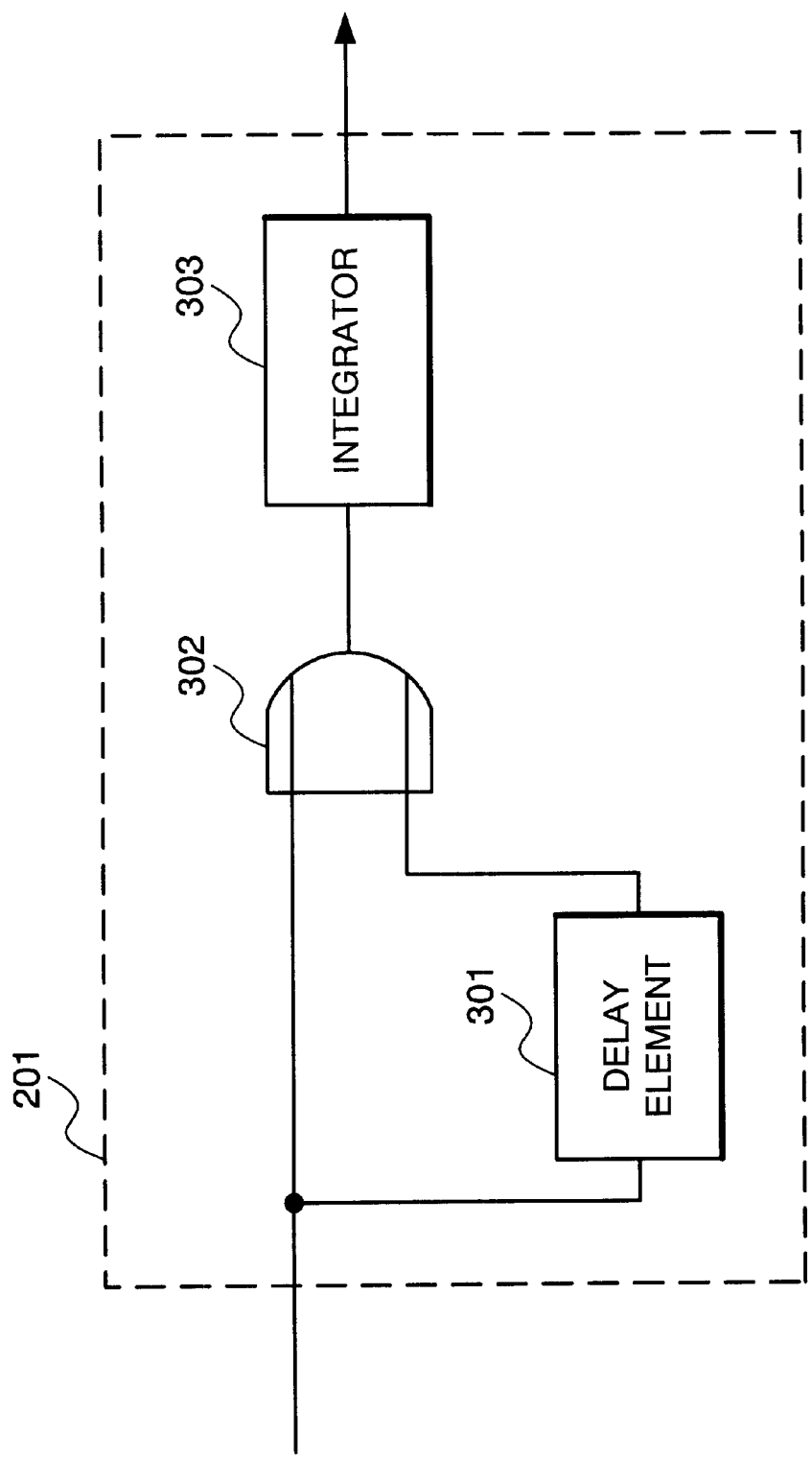
FIG. 3 is a diagram showing a structure of an autocorrelation detector for use in a signal input cutoff detector of the present invention.

Structure of the signal input cutoff detector is shown in FIG. 2 including the internal structures of the above-described signal cutoff detector 101 and out-of-synchronization detector 102. In FIG. 2, the signal cutoff detector 101 is structured to include an autocorrelation detector 201 and a comparator 202. The out-of-synchronization detector 102 is structured to include a comparator 203. One example of the structure of the autocorrelation detector 201 is shown in FIG. 3. The autocorrelation detector 201 of FIG. 3 is structured to include a delay element 301, an exclusive-OR circuit 302 and an integrator 303. A delay time by the delay element 301 is set to be half the length of one bit of a data signal in the present embodiment.

In order to calculate an autocorrelation of an applied data signal, the autocorrelation detector 201 branches the data signal into two and delays one of them by a predetermined time by the delay element 301 to obtain an exclusive OR with the other, which exclusive OR is integrated for a predetermined time at the integrator 302 at the subsequent stage and a mean value of the integration is output.

The output of the autocorrelation detector 201 is compared with a predetermined reference voltage at the comparator 202 to make a determination of normality/abnormality. At this time, two reference voltages (hereinafter referred to as Vref1 and Vref2) for detecting both abnormalities in a case where the output of the autocorrelation detector 201 is larger than that a normal voltage (VS) and in a case where the same is smaller than the normal voltage (VS). Under the conditions, when the output of the autocorrelation detector 201 falls between Vref1 and Vref2, it is determined that the output is normal and otherwise, it is determined that the same is abnormal.

Next, the out-of-synchronization detector will be described. The out-of-synchronization detector compares, at the comparator 203, a VCO control signal from a frequency phase-locked loop for synchronizing frequencies and phases of a data signal and a VCO with a predetermined reference voltage and when the signal is larger than the reference voltage, determines that out-of-synchronization, that is, an abnormality occurs, to output a signal to that effect (a logical signal which attains a logical high level in a case of abnormality).

Although the VCO control signal is a control signal for synchronizing a frequency and a phase of a VCO with those of a data signal, it corresponds to a phase error or a frequency error between the VCO and the data. Monitoring the signal therefore enables a degree of a phase error or a frequency error to be found.

Operation of the signal input cutoff detector of the present embodiment will be described with reference to FIGS. 4 and 5.

Figure 4:
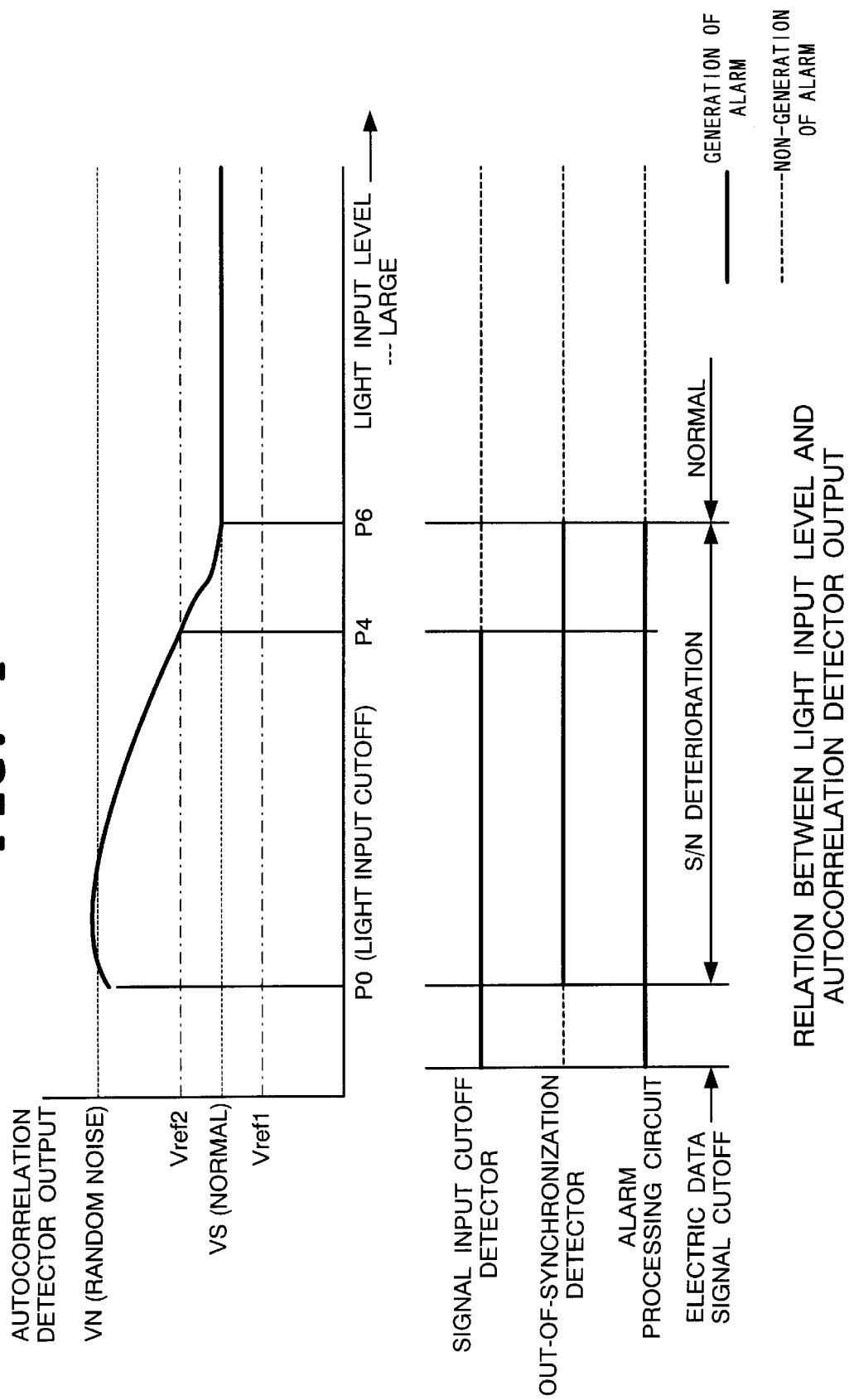
FIG. 4 is a diagram showing a relation between a light input level and an output of the autocorrelation detector.

Relation between power of an input light signal and an output of the autocorrelation detector 201 is shown in FIG. 4. When a light input level is high, if a data signal is an NRZ code having a mark rate of ½, the output will be approximately one-fourth (VS) a peak value of the data signal. However, when the light input level is lowered to make noise power relatively large, autocorrelation starts failing to approximate to a random noise, whereby the output increases from one-fourth the peak value of the data signal and exceeds the alarm threshold value Vref2 to approximate to half (VN) the peak value of the data signal. Accordingly, the signal cutoff detector 101 is allowed to generate an alarm at the light input levels P0 (light input is cut off) to P4 (alarm threshold value Vref2). Also when the signal itself fails to exist due to a failure of an electric circuit, the detector is naturally allowed to generate an alarm. However, since the detector will not generate an alarm unless the light input level goes below P4 (alarm threshold value Vref2), it is not allowed to generate an alarm over all the regions P0 to P6 in which a predetermined transmission path quality can not be ensured because of deterioration of an S/N of the data signal.

On the other hand, while the out-of-synchronization detector 102 is allowed to generate an alarm over the light input levels P0 to P6 in which a predetermined transmission quality can not be ensured because of deterioration of an S/N of the data signal, when the signal itself fails to exist due to a failure of an electric circuit, the VCO control signal can not be detected, disabling generation of an alarm.

In other words, use both of the signal cutoff detector 101 and the out-of-synchronization detector 102 enables reliable generation of an alarm over all the regions of the light levels P0 to P6 in which a predetermined transmission quality can not be ensured due to deterioration of an S/N of the data signal and also at the time of a failure of an electric circuit.

Figure 5:
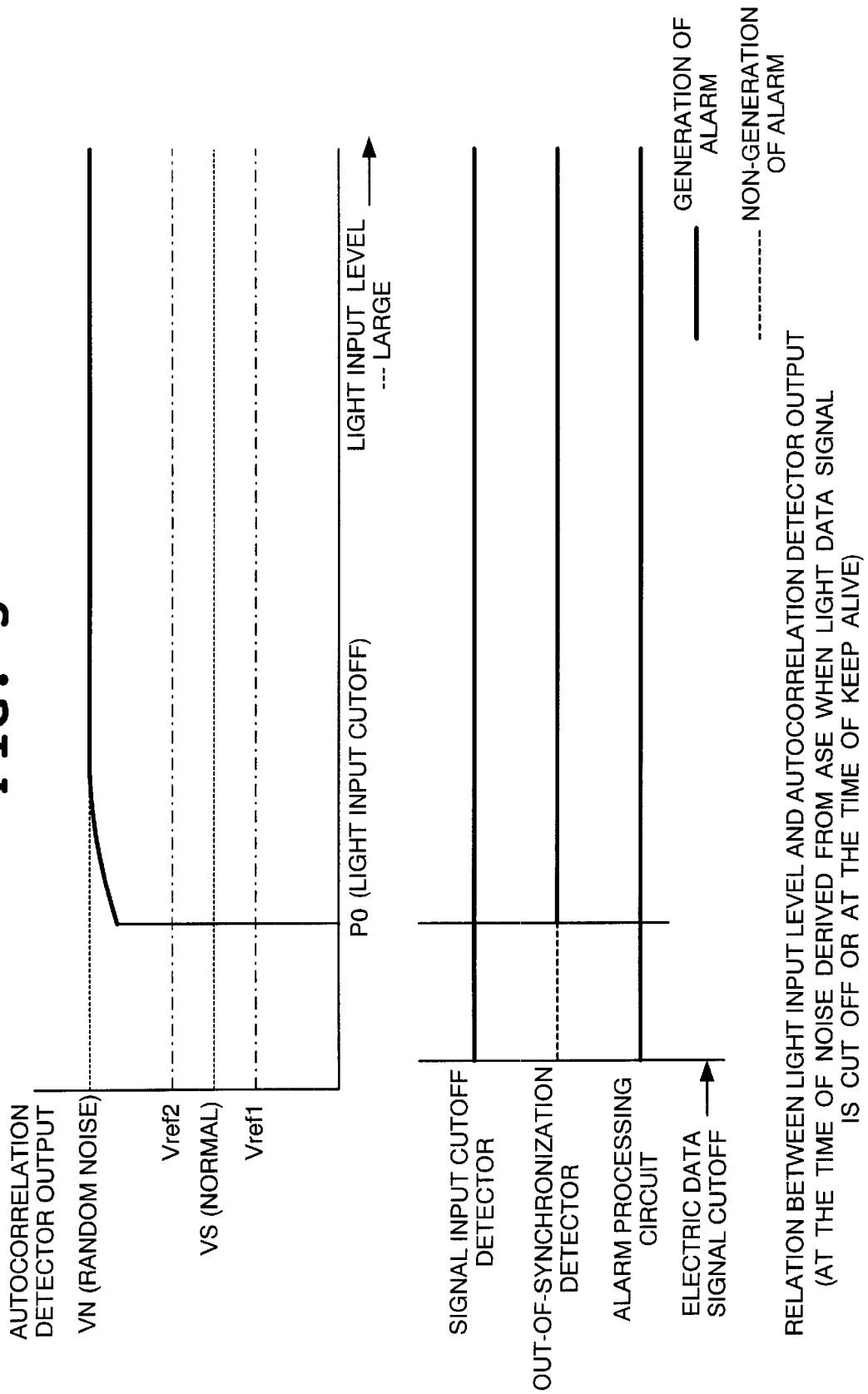
FIG. 5 is a diagram showing a relation between a light input level and an output of the autocorrelation detector (at the time of noise derived from ASE when a light data signal is cut off or at the time of keep alive)

FIG. 5 shows a light input level and an output of the autocorrelation detector 201 at the time only of a noise derived from ASE when a light data signal is cut off or at the time of CW reception in keep alive. When a modulation signal to be superposed on a light signal is cut off, a random noise is generated, so that a level half (VN) the peak value of the data signal is maintained. This is also the case with reception of a CW light by keep alive. The signal cutoff detector 101 is accordingly allowed to reliably generate an alarm.

On the other hand, the out-of-synchronization detector 102 is also allowed to reliably generate an alarm when light is applied because it contains only a noise component. When a signal to a frequency phase-locked loop itself fails to exist in a case of an electric circuit failure, the detector is not allowed to generate an alarm.

(Second Embodiment)

In the first embodiment of the present invention, when a gain of an AGC amplifier or a limiter amplifier for supplying a data signal to a signal cutoff detector or a frequency phase-locked loop for reproducing a clock is large enough, a fixed amplitude can be maintained irrespective of variation of a light input level and even at the cutoff of light input, a fixed amplitude can be maintained by amplifying a thermal noise generated from a preamplifier or the like. In actual designing, however, a gain of an AGC amplifier or a limiter amplifier is set to be low to some extent giving preference to stable operation of the amplifier in many cases.

In such a case, when the light input level goes below P4, for example, the AGC amplifier or the limiter amplifier can not maintain a predetermined amplitude as can be seen from FIG. 7. The output of the autocorrelation detector therefore starts decreasing with P4 as a peak, so that from P1 to P3, an alarm can not be generated. When the light level further goes down to below P1, the detector again generates an alarm.

On the other hand, when the light input level becomes lower than P2, the out-of-synchronization detector lacks a data amplitude necessary for stably operating the frequency phase-lock loop to be unable to operate stably. Therefore, there is a shortcoming that between the light input levels P1 and P2, a region is generated where an alarm can not be reliably generated. Also at the time of a noise derived from ASE when a light data signal is cut off or at the reception of CW in keep alive, a region where an alarm can not be reliably generated is generated between the light input levels P1 and P2 as shown in FIG. 8.

Figure 6:
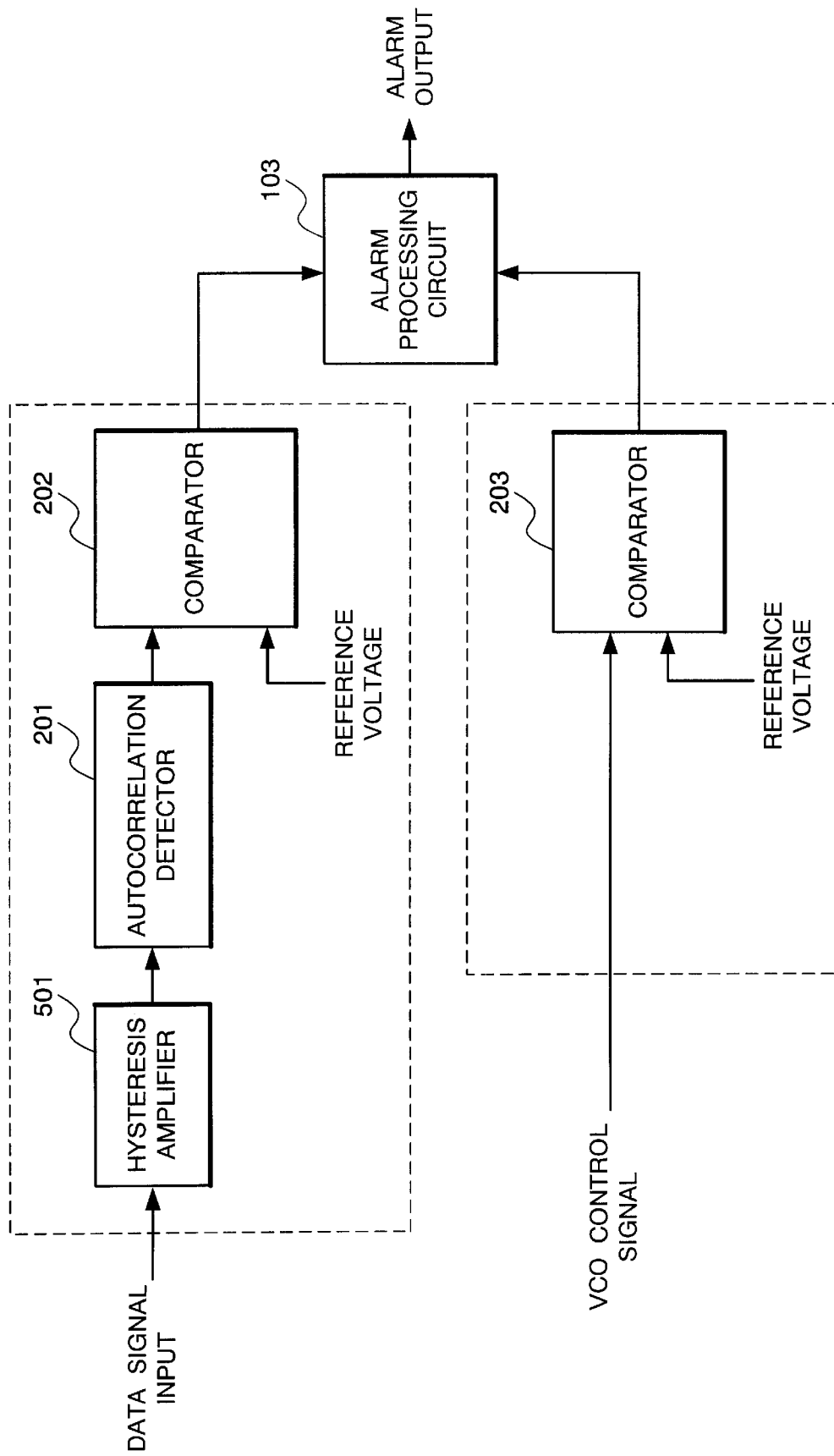
FIG. 6 is a diagram showing a structure of a signal input cutoff detector according to a second embodiment of the present invention.
Figure 12:
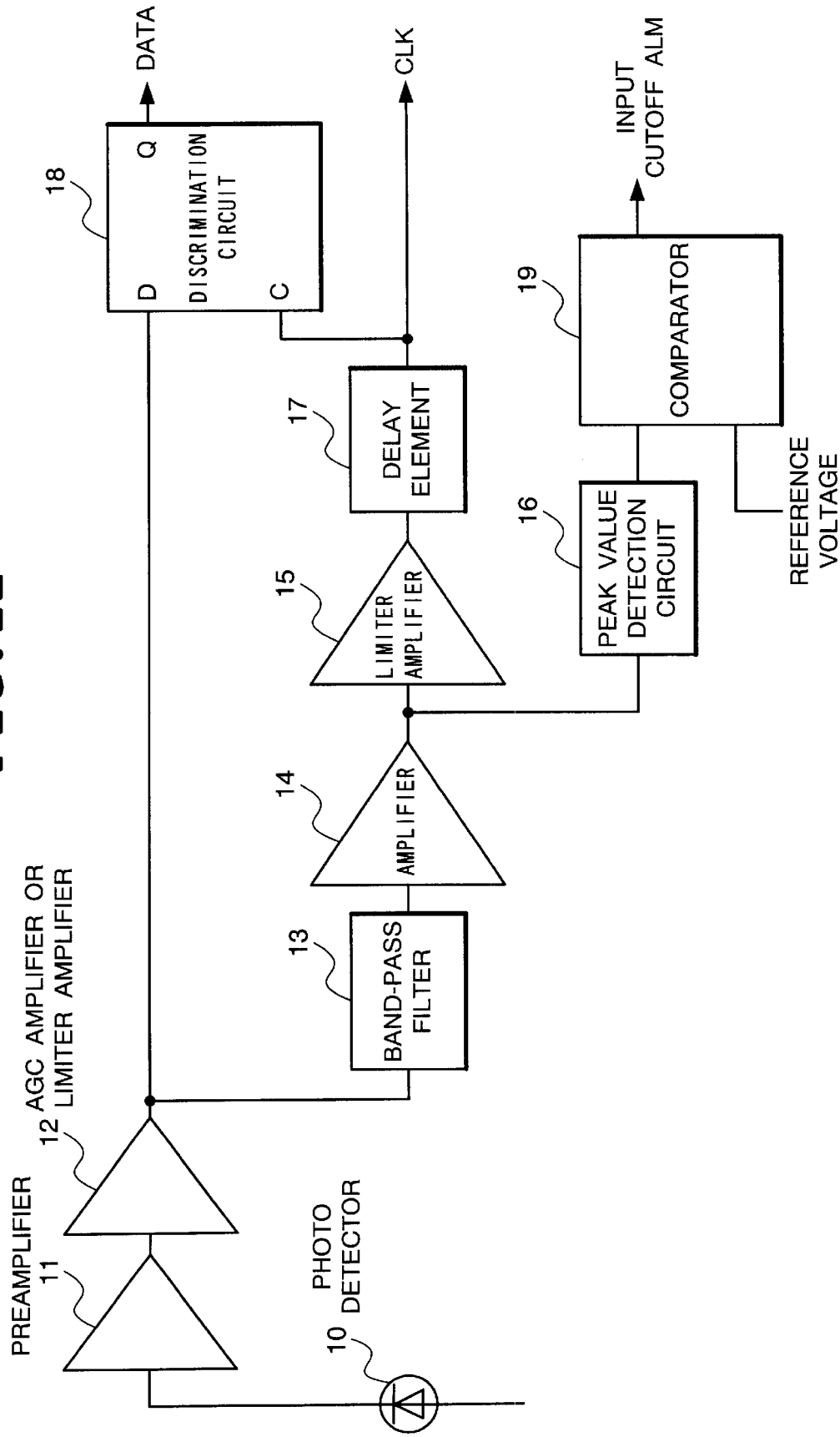
FIG. 12 is a diagram showing a structure of a photo receiver according a conventional technique.

Such a shortcoming is overcome by the second embodiment of the present invention. Structure of a signal input cutoff detector according to the second embodiment of the present invention is shown in FIG. 6. In the present embodiment, the signal input cutoff detector of the first embodiment is newly provided with a hysteresis amplifier 501. The hysteresis amplifier 501 is an amplifier whose input and output relation has hysteresis characteristics.

By setting the hysteresis amplifier 501 to have an appropriate hysteresis width, effects of noise power when applied light signal power is small can be reduced. In other words, when a superposed noise is less than the hysteresis width, an output of the hysteresis amplifier 501 remains unchanged, so that a noise applied to the autocorrelation detector 201 as a random pattern independent of a data signal will be reduced. Furthermore, since a mean value of a signal component draws near to zero with the decrease of a light input level, the output of the autocorrelation detector 201 will be decreased monotonously with the light input level as shown in FIG. 9. Therefore, at the comparator 202, it is only necessary to set one reference voltage (Vref1) at the time of determination of normality/abnormality.

Since the out-of-synchronization detector has its operation unstable when the light input is below P2 similarly to the first embodiment, reliable generation of an alarm over all the regions of the light input levels P0 to P4 needs use of both the signal cutoff detector 101 and the out-of-synchronization detector 102. It is clearly understood that at this time, the reference voltage (Vref1) is set such that an alarm generation region of the signal cutoff detector 101 and an alarm generation region of the out-of-synchronization detector 102 overlap with each other.

Also at the time of a noise derived from ASE or keep alive, the signal cutoff detector 101 and the out-of-synchronization detector 102 should be both used to reliably generate an alarm as shown in FIG. 10.

Furthermore, the present embodiment enables abnormality occurring places to be grasped to some extent by monitoring outputs of the above-described two circuits in combination. Table therefor is shown in FIG. 11. When the output of the signal input detector 101 causes generation of an alarm and the output of the out-of-synchronization detector 102 is unstable, for example, it can be seen that input to the photo receiver is cut off.

(Third Embodiment)

Figure 13:
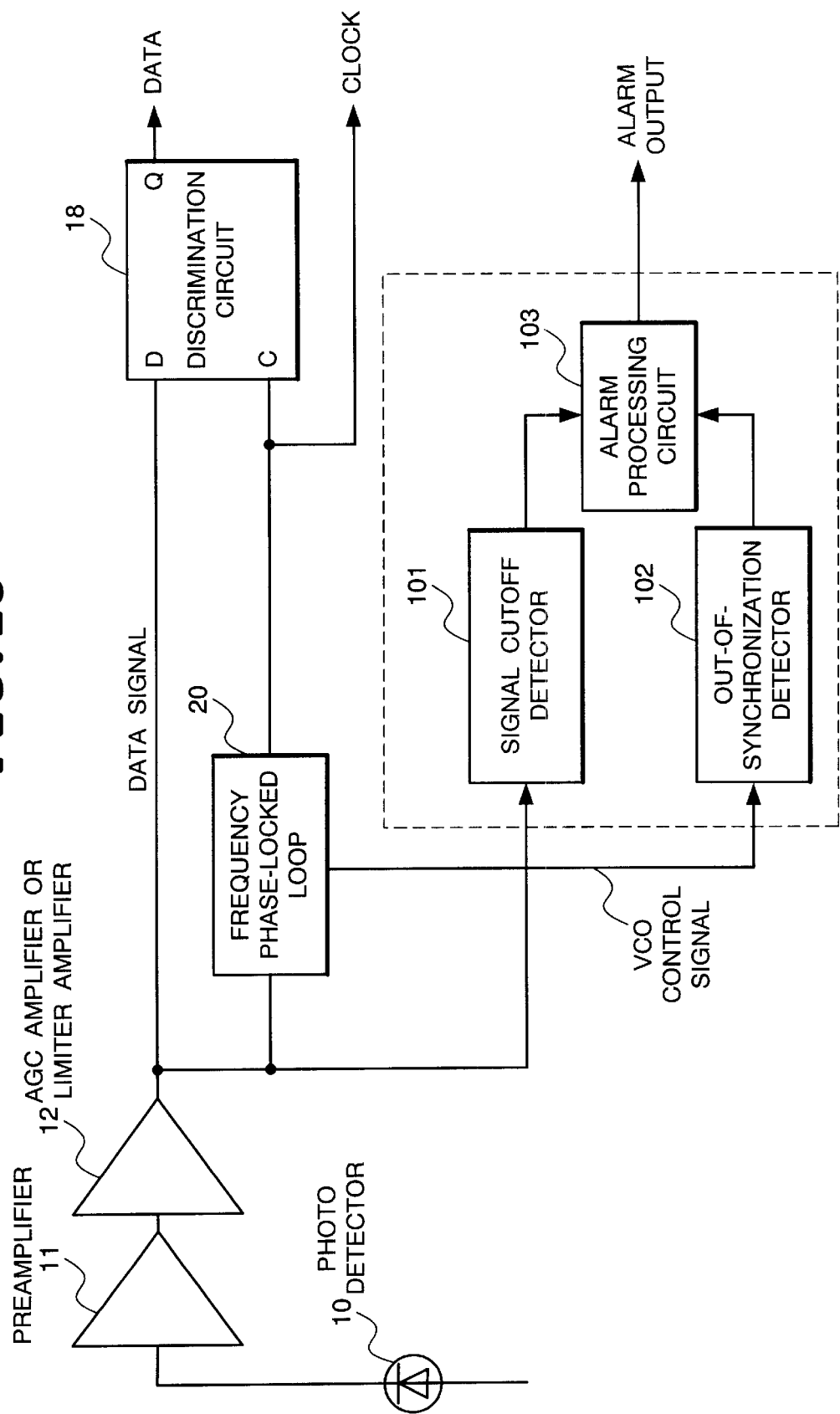
FIG. 13 is a diagram showing a photo receiver using the signal input cutoff detector of the present invention.

FIG. 13 is an example of a structure of a photo receiver using the signal input cutoff detector of the present invention.

The photo receiver is structured to include a photo detector 10 and a preamplifier 11 for converting a light input signal into an electric signal, an AGC amplifier or limiter amplifier 12 for amplifying an output of the preamplifier 11 to have a predetermined amplitude, a frequency phase-locked loop 20 which contains a VCO and generates a clock synchronized with an output of the AGC amplifier or limiter amplifier 12 (data signal), a discrimination circuit 18 for discriminating the data signal by the clock, a signal cutoff detector 101 for detecting the data signal existing or not, an out-of-synchronization detector 102 responsive to a VCO control signal of the frequency phase-locked loop 20 for detecting out-of-synchronization, and an alarm processing circuit for processing an alarm from the signal cutoff detector 101 and an alarm from the out-of-synchronization detector 102.

As described in the foregoing, being provided with a signal cutoff detector and an out-of-synchronization detector to combine alarm outputs of both the detectors, the signal input cutoff detector according to the present invention enables reliable generation of an alarm against a possible failure at a photo receiver, thereby grasping abnormality occurring places to some extent.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A signal input cutoff detector comprising:
    a signal cutoff detector which detects a level of a data signal converted from a light input signal into an electric signal and when the level is below a predetermined value, generates a first alarm signal; and
    an out-of-synchronization detector which monitors a VCO control signal which controls a voltage controlled oscillator (VCO) to have a frequency and a phase synchronized with said data signal and when a level of the control signal exceeds a predetermined value, generates a second alarm signal.

2. The signal input cutoff detector as set forth in claim 1, further comprising an alarm processor which generates a third alarm signal according to generation conditions of said first alarm signal and second alarm signal.

3. The signal input cutoff detector as set forth in claim 1, wherein
    said signal cutoff detector including
    an autocorrelation detector which calculates an autocorrelation of said data signal to output an autocorrelation signal, and
    a first comparator which compares said autocorrelation signal with at least one predetermined reference voltage and when said autocorrelation signal is larger, outputs said first alarm signal.

4. The signal input cutoff detector as set forth in claim 1, further comprising
    an alarm processor which generates a third alarm signal according to generation conditions of said first alarm signal and second alarm signal, wherein
    said signal cutoff detector including
        an autocorrelation detector which calculates an autocorrelation of said data signal to output an autocorrelation signal, and
        a first comparator which compares said autocorrelation signal with at least one predetermined reference voltage and when said autocorrelation signal is larger, outputs said first alarm signal.

5. The signal input cutoff detector as set forth in claim 1, wherein
    said signal cutoff detector including
        an autocorrelation detector which calculates an autocorrelation of said data signal to output an autocorrelation signal, and
        a first comparator which compares said autocorrelation signal with at least one predetermined reference voltage and when said autocorrelation signal is larger, outputs said first alarm signal, and
    said autocorrelation detector including
        a delay element which delays said data signal by a predetermined delay time to output a delayed data signal,
        an exclusive OR circuit which calculates an exclusive OR of said data signal and said delayed data signal to output an exclusive OR signal, and
        a first integrator which calculates a mean value of said exclusive OR signal.

6. The signal input cutoff detector as set forth in claim 1, further comprising
    an alarm processor which generates a third alarm signal according to generation conditions of said first alarm signal and second alarm signal, wherein
    said signal cutoff detector including
        an autocorrelation detector which calculates an autocorrelation of said data signal to output an autocorrelation signal, and
        a first comparator which compares said autocorrelation signal with at least one predetermined reference voltage and when said autocorrelation signal is larger, outputs said first alarm signal, and
    said autocorrelation detector including
        a delay element which delays said data signal by a predetermined delay time to output a delayed data signal,
        an exclusive OR circuit which calculates an exclusive OR of said data signal and said delayed data signal to output an exclusive OR signal, and
        a first integrator which calculates a mean value of said exclusive OR signal.

7. The signal input cutoff detector as set forth in claim 1, wherein
    said signal cutoff detector including
        an autocorrelation detector which calculates an autocorrelation of said data signal to output an autocorrelation signal, and
        a first comparator which compares said autocorrelation signal with at least one predetermined reference voltage and when said autocorrelation signal is larger, outputs said first alarm signal, and
    said autocorrelation detector including
        a delay element which delays said data signal by a predetermined delay time to output a delayed data signal,
        an exclusive OR circuit which calculates an exclusive OR of said data signal and said delayed data signal to output an exclusive OR signal, and
        a first integrator which calculates a mean value of said exclusive OR signal,
        said delay time being half a time length of one bit of said data signal.

8. The signal input cutoff detector as set forth in claim 1, further comprising
    an alarm processor which generates a third alarm signal according to generation conditions of said first alarm signal and second alarm signal, wherein
    said signal cutoff detector including an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal, and
said autocorrelation detector including
a delay element which delays said data signal by a predetermined delay time to output a delayed data signal,
an exclusive OR circuit which calculates an exclusive OR of said data signal and said delayed data signal to output an exclusive OR signal, and
a first integrator which calculates a mean value of said exclusive OR signal,
said delay time being half a time length of one bit of said data signal.

9. The signal input cutoff detector as set forth in claim 1, wherein
said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal,
said at least one predetermined reference voltage including
a first reference voltage having a value between said mean value obtained when said data signal is large enough and zero, and
a second reference voltage higher than said mean value obtained when said data signal is large enough.

10. The signal input cutoff detector as set forth in claim 1, further comprising
an alarm processor which generates a third alarm signal according to generation conditions of said first alarm signal and second alarm signal, wherein
said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal,
said at least one predetermined reference voltage including
a first reference voltage having a value between said mean value obtained when said data signal is large enough and zero, and
a second reference voltage higher than said mean value obtained when said data signal is large enough.

11. The signal input cutoff detector as set forth in claim 1, wherein
said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal, and
said autocorrelation detector including
a delay element which delays said data signal by a predetermined delay time to output a delayed data signal,
an exclusive OR circuit which calculates an exclusive OR of said data signal and said delayed data signal to output an exclusive OR signal, and
a first integrator which calculates a mean value of said exclusive OR signal,
said at least one predetermined reference voltage including
a first reference voltage having a value between said mean value obtained when said data signal is large enough and zero, and
a second reference voltage higher than said mean value obtained when said data signal is large enough.

12. The signal input cutoff detector as set forth in claim 1, wherein
said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal, and
said autocorrelation detector including
a delay element which delays said data signal by a predetermined delay time to output a delayed data signal,
an exclusive OR circuit which calculates an exclusive OR of said data signal and said delayed data signal to output an exclusive OR signal, and
a first integrator which calculates a mean value of said exclusive OR signal,
said delay time being half a time length of one bit of said data signal, and
said at least one predetermined reference voltage including
a first reference voltage having a value between said mean value obtained when said data signal is large enough and zero, and
a second reference voltage higher than said mean value obtained when said data signal is large enough.

13. The signal input cutoff detector as set forth in claim 1, wherein
said signal cutoff detector further including
a hysteresis amplifier provided at an input part of said signal cutoff detector.

14. The signal input cutoff detector as set forth in claim 1, further comprising
an alarm processor which generates a third alarm signal according to generation conditions of said first alarm signal and second alarm signal, wherein
said signal cutoff detector further including
a hysteresis amplifier provided at an input part of said signal cutoff detector.

15. The signal input cutoff detector as set forth in claim 1, wherein
said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal, and which further comprises
a hysteresis amplifier provided at an input part of said signal cutoff detector.

16. The signal input cutoff detector as set forth in claim 1, wherein
said signal cutoff detector including
an autocorrelation detector which calculates an autocorrelation of said data signal to output an autocorrelation signal,
a first comparator which compares said autocorrelation signal with at least one predetermined reference voltage and when said autocorrelation signal is larger, outputs said first alarm signal, and
a hysteresis amplifier provided at an input part of said signal cutoff detector,
said autocorrelation detector including
a delay element which delays said data signal by a predetermined delay time to output a delayed data signal,
an exclusive OR circuit which calculates an exclusive OR of said data signal and said delayed data signal to output an exclusive OR signal, and
a first integrator which calculates a mean value of said exclusive OR signal.

17. The signal input cutoff detector as set forth in claim 1, wherein
said signal cutoff detector including
an autocorrelation detector which calculates an autocorrelation of said data signal to output an autocorrelation signal,
a first comparator which compares said autocorrelation signal with at least one predetermined reference voltage and when said autocorrelation signal is larger, outputs said first alarm signal, and
a hysteresis amplifier provided at an input part of said signal cutoff detector,
said autocorrelation detector including
a delay element which delays said data signal by a predetermined delay time to output a delayed data signal,
an exclusive OR circuit which calculates an exclusive OR of said data signal and said delayed data signal to output an exclusive OR signal, and
a first integrator which calculates a mean value of said exclusive OR signal,
said delay time being half a time length of one bit of said data signal.

18. The signal input cutoff detector as set forth in claim 1, wherein
said signal cutoff detector including
an autocorrelation detector which calculates an autocorrelation of said data signal to output an autocorrelation signal,
a first comparator which compares said autocorrelation signal with at least one predetermined reference voltage and when said autocorrelation signal is larger, outputs said first alarm signal, and
a hysteresis amplifier provided at an input part of said signal cutoff detector,
said at least one predetermined reference voltage including
a first reference voltage having a value between said mean value obtained when said data signal is large enough and zero, and
a second reference voltage higher than said mean value obtained when said data signal is large enough.

19. The signal input cutoff detector as set forth in claim 1, wherein
said out-of-synchronization detector including
a second comparator which compares a VCO control signal which controls a voltage controlled oscillator (VCO) to have a frequency and a phase synchronized with said data signal and a predetermined reference voltage and when the VCO control signal is larger, outputs said second alarm signal.

20. The signal input cutoff detector as set forth in claim 1, further comprising
an alarm processor which generates a third alarm signal according to generation conditions of said first alarm signal and second alarm signal,
wherein said out-of-synchronization detector including
a second comparator which compares a VCO control signal which controls a voltage controlled oscillator (VCO) to have a frequency and a phase synchronized with said data signal and a predetermined reference voltage and when the VCO control signal is larger, outputs said second alarm signal.

21. The signal input cutoff detector as set forth in claim 1, wherein
said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputting said first alarm signal, and
said out-of-synchronization detector including
a second comparator which compares a VCO control signal which controls a voltage controlled oscillator (VCO) to have a frequency and a phase synchronized with said data signal and a predetermined reference voltage and when the VCO control signal is larger, outputs said second alarm signal.

22. The signal input cutoff detector as set forth in claim 1, wherein
said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal, and
said out-of-synchronization detector including
a second comparator which compares a VCO control signal which controls a voltage controlled oscillator (VCO) to have a frequency and a phase synchronized with said data signal and a predetermined reference voltage and when the VCO control signal is larger, outputs said second alarm signal,
said autocorrelation detector including
a delay element which delays said data signal by a predetermined delay time to output a delayed data signal,
an exclusive OR circuit which calculates an exclusive OR of said data signal and said delayed data signal to output an exclusive OR signal, and
a first integrator which calculates a mean value of said exclusive OR signal.

23. The signal input cutoff detector as set forth in claim 1, wherein
said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal, and
said out-of-synchronization detector including
a second comparator which compares a VCO control signal which controls a voltage controlled oscillator (VCO) to have a frequency and a phase synchronized with said data signal and a predetermined reference voltage and when the VCO control signal is larger, outputs said second alarm signal,
said autocorrelation detector including
a delay element which delays said data signal by a predetermined delay time to output a delayed data signal,
an exclusive OR circuit which calculates an exclusive OR of said data signal and said delayed data signal to output an exclusive OR signal, and
a first integrator which calculates a mean value of said exclusive OR signal, and
said delay time being half a time length of one bit of said data signal.

24. The signal input cutoff detector as set forth in claim 1, wherein
said signal cutoff detector including
an autocorrelation detector which calculats an autocorrelation of said data signal to output an autocorrelation signal, and
a first comparator which compares said autocorrelation signal with at least one predetermined reference voltage and when said autocorrelation signal is larger, outputs said first alarm signal, and
said out-of-synchronization detector including
a second comparator which compares a VCO control signal which controls a voltage controlled oscillator (VCO) to have a frequency and a phase synchronized with said data signal and a predetermined reference voltage and when the VCO control signal is larger, outputs said second alarm signal,
said at least one predetermined reference voltage including
a first reference voltage having a value between said mean value obtained when said data signal is large enough and zero, and
a second reference voltage higher than said mean value obtained when said data signal is large enough.

25. The signal input cutoff detector as set forth in claim 1, wherein
said signal cutoff detector further including
a hysteresis amplifier provided at an input part of said signal cutoff detector, and
said out-of-synchronization detector including
a second comparator which compares a VCO control signal which controls a voltage controlled oscillator (VCO) to have a frequency and a phase synchronized with said data signal and a predetermined reference voltage and when the VCO control signal is larger, outputs said second alarm signal.

26. A photo receiver comprising:
a photo detector which converts a light input signal into an electric signal,
an amplifier which amplifies said electric signal to have a predetermined amplitude,
a frequency phase-locked loop which contains a VCO and generates a clock synchronized with an output of said amplifier and a discrimination circuit for discriminating an output of said amplifier by said clock, and
a signal input cutoff detector, wherein
said signal input cutoff detector including
a signal cutoff detector which detects a level of a data signal converted from a light input signal into an electric signal and when the level is below a predetermined value, generates a first alarm signal, and
an out-of-synchronization detector which monitors a VCO control signal which controls a voltage controlled oscillator (VCO) to have a frequency and a phase synchronized with said data signal and when a level of the control signal exceeds a predetermined value, generates a second alarm signal.

27. The photo receiver as set forth in claim 26, wherein said signal input cutoff detector further including
an alarm processor which generates a third alarm signal according to generation conditions of said first alarm signal and second alarm signal.

28. The photo receiver as set forth in claim 26, wherein said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal.

29. The photo receiver as set forth in claim 26, wherein said signal input cutoff detector further including
an alarm processor which generates a third alarm signal according to generation conditions of said first alarm signal and second alarm signal,
said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal.

30. The photo receiver as set forth in claim 26, wherein said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputting said first alarm signal, and
said autocorrelation detector including
a delay element which delays said data signal by a predetermined delay time to output a delayed data signal,
an exclusive OR circuit which calculates an exclusive OR of said data signal and said delayed data signal to output an exclusive OR signal, and a first integrator which calculates a mean value of said exclusive OR signal.

31. The photo receiver as set forth in claim 26, wherein said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal, and
said autocorrelation detector including
a delay element which delays said data signal by a predetermined delay time to output a delayed data signal,
an exclusive OR circuit which calculates an exclusive OR of said data signal and said delayed data signal to output an exclusive OR signal, and
a first integrator which calculates a mean value of said exclusive OR signal,
said delay time being half a time length of one bit of said data signal.

32. The photo receiver as set forth in claim 26, wherein said signal cutoff detector including
an autocorrelation detector which calculates an autocorrelation of said data signal to output an autocorrelation signal, and
a first comparator which compares said autocorrelation signal with at least one predetermined reference voltage and when said autocorrelation signal is larger, outputs said first alarm signal,
said at least one predetermined reference voltage including
a first reference voltage having a value between said mean value obtained when said data signal is large enough and zero, and
a second reference voltage higher than said mean value obtained when said data signal is large enough.

33. The photo receiver as set forth in claim 26, wherein said signal cutoff detector further including
a hysteresis amplifier provided at an input part of said signal cutoff detector.

34. The photo receiver as set forth in claim 26, wherein said out-of-synchronization detector including
a second comparator which compares a VCO control signal which controls a voltage controlled oscillator (VCO) to have a frequency and a phase synchronized with said data signal and a predetermined reference voltage and when the VCO control signal is larger, outputs said second alarm signal.

35. A signal input cutoff detecting method comprising the steps of:
detecting a level of a data signal converted from a light input signal into an electric signal and when the level is below a predetermined value, generating a first alarm signal, and
monitoring a VCO control signal which controls a voltage controlled oscillator (VCO) to have a frequency and a phase synchronized with said data signal and when a level of the control signal exceeds a predetermined value, generating a second alarm signal.

36. The signal input cutoff detecting method as set forth in claim 35, further comprising
alarm processing step of generating a third alarm signal according to generation conditions of said first alarm signal and second alarm signal.

37. The signal input cutoff detecting method as set forth in claim 35, wherein
said signal input cutoff detection step includes:
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal.

38. The signal input cutoff detecting method as set forth in claim 35, further comprising
alarm processing step of generating a third alarm signal according to generation conditions of said first alarm signal and second alarm signal, wherein
said signal input cutoff detection step includes:
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal.

39. The signal input cutoff detecting method as set forth in claim 35, wherein
said signal input cutoff detection step includes:
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal,
said at least one predetermined reference voltage including:
a first reference voltage having a value between said mean value obtained when said data signal is large enough and zero, and
a second reference voltage higher than said mean value obtained when said data signal is large enough.

40. The signal input cutoff detecting method as set forth in claim 35, further comprising
alarm processing step of generating a third alarm signal according to generation conditions of said first alarm signal and second alarm signal, wherein
said signal input cutoff detection step includes:
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal,
said at least one predetermined reference voltage including:
a first reference voltage having a value between said mean value when said data signal is large enough and zero, and
a second reference voltage higher than said mean value obtained when said data signal is large enough.

41. The signal input cutoff detecting method as set forth in claim 35, wherein
said out-of-synchronization detection step includes
second comparison step of comparing a VCO control signal which controls a voltage controlled oscillator (VCO) to have a frequency and a phase synchronized with said data signal and a predetermined reference voltage and when the VCO control signal is larger, outputting said second alarm signal.

42. The signal input cutoff detecting method as set forth in claim 35, further comprising
alarm processing step of generating a third alarm signal according to generation conditions of said first alarm signal and second alarm signal, wherein
said out-of-synchronization detection step includes
second comparison step of comparing a VCO control signal which controls a voltage controlled oscillator (VCO) to have a frequency and a phase synchronized with said data signal and a predetermined reference voltage and when the VCO control signal is larger, outputting said second alarm signal.

43. The signal input cutoff detecting method as set forth in claim 35, wherein
said signal input cutoff detection step includes:
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal, and
said out-of-synchronization detection step includes
second comparison step of comparing a VCO control signal which controls a voltage controlled oscillator (VCO) to have a frequency and a phase synchronized with said data signal and a predetermined reference voltage and when the VCO control signal is larger, outputting said second alarm signal.

44. The signal input cutoff detecting method as set forth in claim 35, further comprising
alarm processing step of generating a third alarm signal according to generation conditions of said first alarm signal and second alarm signal, wherein
said signal input cutoff detection step includes:
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal, and
said out-of-synchronization detection step includes
second comparison step of comparing a VCO control signal which controls a voltage controlled oscillator (VCO) to have a frequency and a phase synchronized with said data signal and a predetermined reference voltage and when the VCO control signal is larger, outputting said second alarm signal.

45. The signal input cutoff detecting method as set forth in claim 35, wherein
said signal input cutoff detection step includes:
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal,
said at least one predetermined reference voltage including:
a first reference voltage having a value between said mean value obtained when said data signal is large enough and zero, and
a second reference voltage higher than said mean value obtained when said data signal is large enough, and
said out-of-synchronization detection step includes
second comparison step of comparing a VCO control signal which controls a voltage controlled oscillator (VCO) to have a frequency and a phase synchronized with said data signal and a predetermined reference voltage and when the VCO control signal is larger, outputting said second alarm signal.

46. The signal input cutoff detecting method as set forth in claim 35, further comprising
alarm processing step of generating a third alarm signal according to generation conditions of said first alarm signal and second alarm signal, wherein
said signal input cutoff detection step including
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal,
said at least one predetermined reference voltage including
a first reference voltage having a value between said mean value obtained when said data signal is large enough and zero, and
a second reference voltage higher than said mean value obtained when said data signal is large enough, and
said out-of-synchronization detection step including
second comparison step of comparing a VCO control signal which controls a voltage controlled oscillator (VCO) to have a frequency and a phase synchronized with said data signal and a predetermined reference voltage and when the VCO control signal is larger, outputting said second alarm signal.

47. A photo receiving method comprising:
step of converting a light input signal into an electric signal and amplifying the converted signal to have a predetermined amplitude,
step of, with a VCO contained, generating a clock synchronized with a data signal amplified to said predetermined amplitude,
step of discriminating a data signal amplified to said predetermined amplitude by said clock,
signal input cutoff detection step of detecting a level of a data signal converted from a light input signal into an electric signal and when the level is below a predetermined value, generating a first alarm signal, and
out-of-synchronization detection step of monitoring a VCO control signal which controls a voltage controlled oscillator (VCO) to have a frequency and a phase synchronized with said data signal and when a level of the control signal exceeds a predetermined value, generating a second alarm signal.

48. The photo receiving method as set forth in claim 47, further comprising
alarm processing step of generating a third alarm signal according to generation conditions of said first alarm signal and second alarm signal.

49. The photo receiving method as set forth in claim 47, wherein said signal input cutoff detection step includes:
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal.

50. The photo receiving method as set forth in claim 47, wherein said signal input cutoff detection step includes:
autocorrelation detection step of calculating an autocorrelation of said data signal to output an autocorrelation signal, and
first comparison step of comparing said autocorrelation signal with at least one predetermined reference voltage and when said autocorrelation signal is larger, outputting said first alarm signal,
said at least one predetermined reference voltage including
a first reference voltage having a value between said mean value obtained when said data signal is large enough and zero, and
a second reference voltage higher than said mean value obtained when said data signal is large enough.

51. The photo receiving method as set forth in claim 47, wherein said out-of-synchronization detection step including
second comparison step of comparing a VCO control signal which controls a voltage controlled oscillator (VCO) to have a frequency and a phase synchronized with said data signal and a predetermined reference voltage and when the VCO control signal is larger, outputting said second alarm signal.

* * * * *